(No Model.)
2 Sheets—Sheet 2.
J. BENNOR.
WATER CLOSET AND TRAP.
No. 289,495. Patented Dec. 4, 1883.
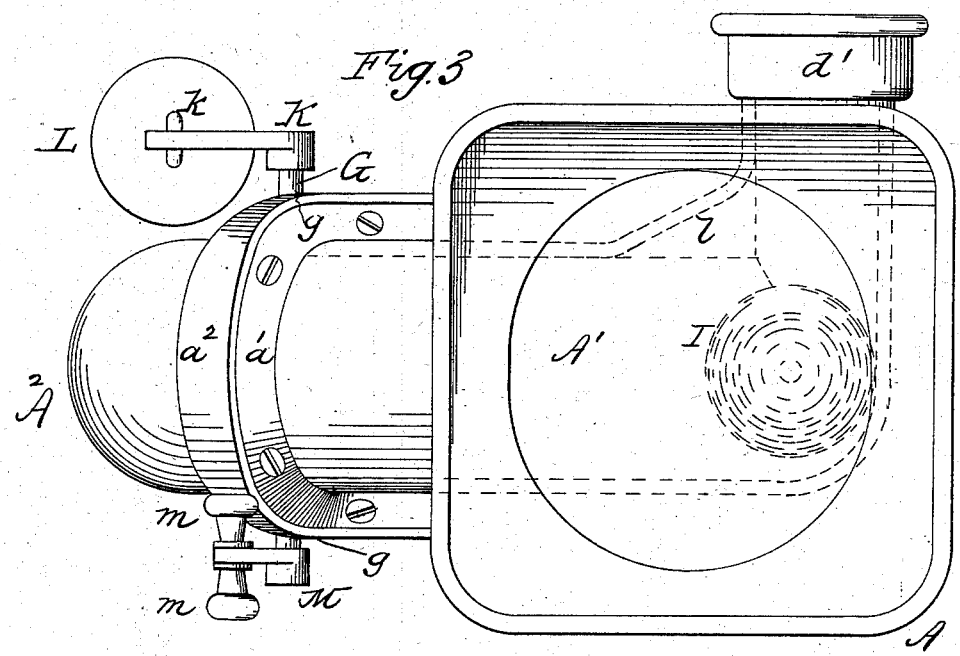
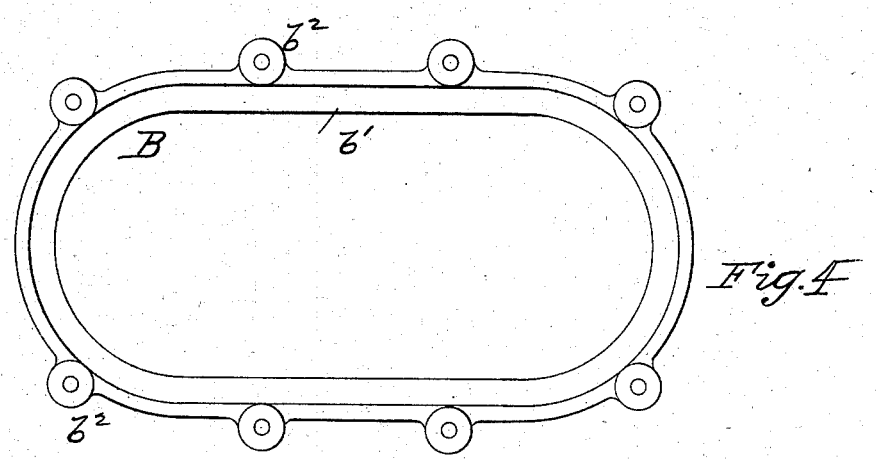
WITNESSES:
C. W. Williams
Edwin Paramore
INVENTOR,
Joseph Bennor
By S. J. Van Stavoren
ATTORNEY

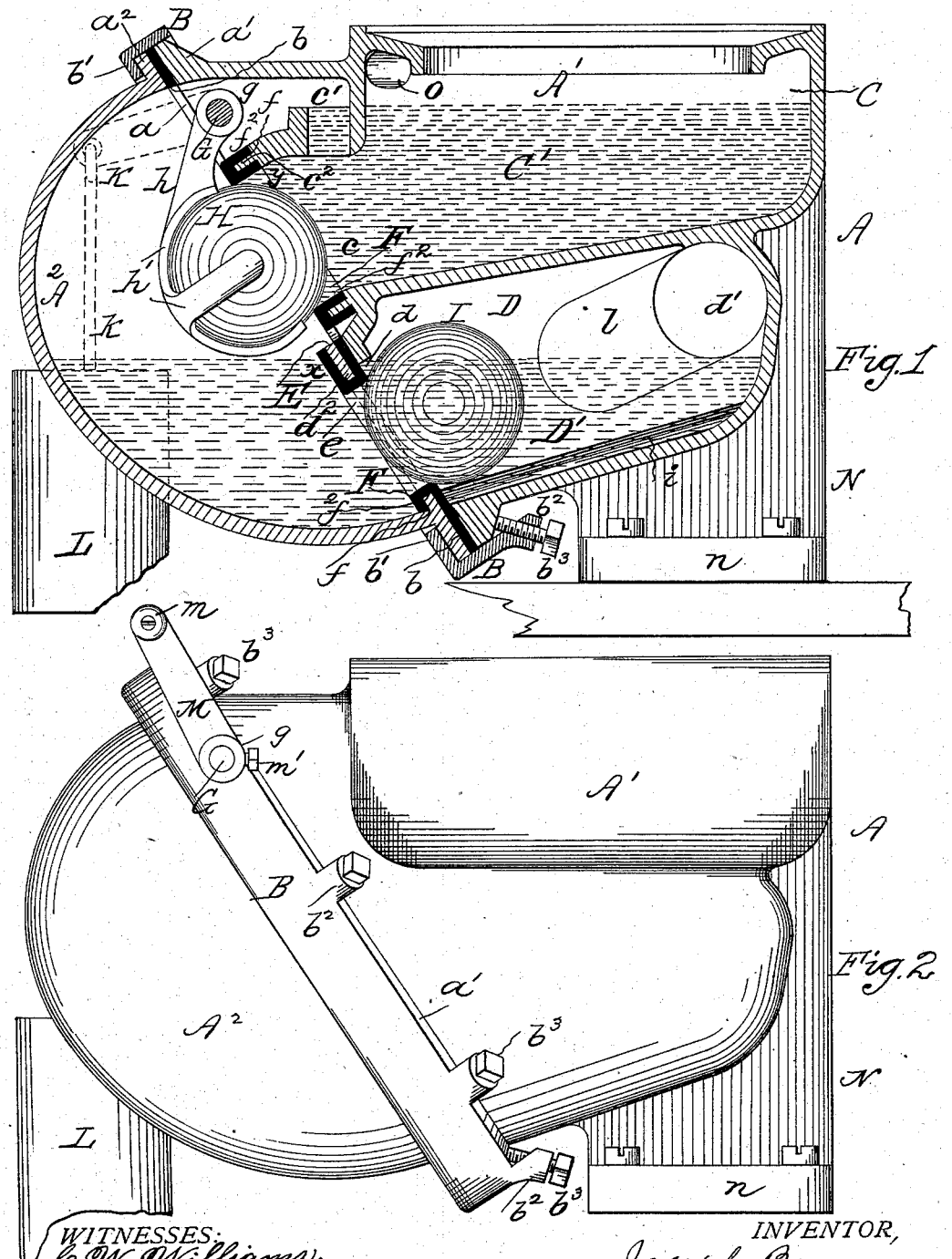

UNITED STATES PATENT OFFICE.

JOSEPH BENNOR, OF PHILADELPHIA, PENNSYLVANIA.

WATER-CLOSET AND TRAP.

SPECIFICATION forming part of Letters Patent No. 289,495, dated December 4, 1883.

Application filed January 3, 1883. (No model.)

*To all whom it may concern:*

Be it known that I, JOSEPH BENNOR, a citizen of the United States, residing at Philadelphia, in the county of Philadelphia and State of Pennsylvania, have invented certain new and useful Improvements in Water-Closets and their Traps, of which the following is a specification, reference being had therein to the accompanying drawings, wherein—

Figure 1 is a longitudinal vertical section of a water-closet embodying my invention. Fig. 2 is a front elevation of same. Fig. 3 is a plan, and Fig. 4 is a detail plan.

My invention has relation to water-closets, having especial reference to their traps, and has for its object to provide a simple and inexpensive water-closet which can be readily and effectually cleansed without disarranging the screw-fastenings between the hopper and its support or floor, and is provided with a trap which is doubly effective for preventing the escape of sewer-gas or fecal-matter odors therefrom.

My invention accordingly consists in the novel combination, construction, and arrangement of parts, as hereinafter more specifically described and claimed, having special reference to a water-closet provided with a trap having a self-fastening gasket or seat for a ball or valve designed to seal the induction-opening thereof.

Referring to Figs. 1 to 4 of the accompanying drawings, A represents a water-closet having an oblique lateral division, $a$, whereby it is divided into two parts or sections, A′ and A², which are provided with abutting flanges $a'$ $a^2$, having interposed packing-ring $b$.

B represents a frame surrounding the flanges $a'$ $a^2$, having on one side a flange, $b'$, abutting against the outside of flange $a^2$, and on the other side a series of lugs, $b^2$, with screws $b^3$. The latter impinge against the flange $a'$, and serve to hold said frame in position and secure the sections A′ A² together, as plainly shown in Figs. 1 and 2. Said frame B is preferably employed when the sections A′ A² are made of porcelain or other similar material; but when they are of iron or other metal their flanges $a'$ $a^2$ are screwed or bolted together, as indicated in Fig. 3, and the frame B is dispensed with. The section A′ is composed of a bowl, C, having an outlet, $c$, with overflow-openings $c'$, and of a lower or trap chamber, D, having an induction-opening, $d$, and outlet $d'$. The section A² is formed with a lower inwardly-projecting plate, E, in line with and resting against the edge of induction-opening $d$ of chamber D. Said plate is provided with an opening, $e$, somewhat smaller than the induction-opening $d$, so as to provide the latter with an annular lip or flange, $d^2$. Around the flange $d^2$ and the edge $c^2$ of outlet $c$ are placed gaskets F, made of rubber or other elastic or flexible material. Said gaskets are formed with annular grooves $f$, into which the flange $d^2$ and edge $c^2$ enter when the gaskets are sprung around the same. When so located, the sides or lips $f^2$ $f^2$ of the gaskets embrace or closely hug said flange and edge and sustain or hold the gaskets in position thereon. Consequently the latter are self fastening or sustaining, and all extraneous or separate means—like screws, plates, &c.—for securing them in position are dispensed with. When the line of location of the packing-ring $b$ corresponds to or is adjacent with that of the gaskets, the latter may be formed integrally with the former, as shown at $x$, Fig. 1, or be separate therefrom, as shown at $y$, said figure.

G represents a shaft having its bearings $g$ $g$ in section A′, and to which is secured an arm, $h$, having fingers or bars $h'$, for grasping and holding a ball or clapper valve, H, which normally finds its seat against the gasket F, surrounding outlet $c$, and closes or seals the same.

I represents a ball-valve in chamber D, which seats upon the gasket F, placed around the induction-opening $d$, so as to seal said opening and trap. It will thus be seen that the hopper C and the trap D are not only provided with the usual water-seal, C′ and D′, respectively, but also with ball-valves, so that the passage of sewer-gas or other odors therethrough is doubly barred. The valve H is maintained in its normal position by means of arm K, secured to shaft G, rod $k$, and weight L.

M represents a handle or lever attached to shaft G by set-screw $m'$, and provided with knobs $m$, for taking hold of when it is desired to oscillate shaft G to move valve H away from outlet $c$ or its gasket. The eduction-outlet $d'$ is formed with an elongated mouth, $l$, as more plainly shown in Fig. 3, in order to facilitate the passage of match-sticks, paper, and fecal or other matter or substances therethrough, and also to prevent the ball or valve I being sucked up to and closing said outlet.

$i$ $i$ represent ways or guides for the ball I to travel on, and N a depending web having feet n, for securing the section A' to the floor or other support. Said web and feet are formed integral with said section, as illustrated.

The operation is obvious. When the closet is used, the handle M is turned or moved, as above described, and the valve H oscillated from its seat. The flushing water or seal in hopper C thereupon flows into section A², carrying the fecal or other deposits with it. The pressure of such water causes the ball D to move up the ways i, thereby unsealing the induction-opening d and allowing the deposits to pass through the trap to the soil-pipe, whereupon the ball I automatically returns to its seat to seal the trap and valve H is restored to its normal position by the weight L. Before such movements take place, however, the flushing water from pipe O in the hopper passes to section A² and trap D, to form the water-seal D' in addition to that of the ball I. The section A² is therefore a container or receiver for hopper C, and the former being removable from the latter, access is easily obtained to the trap-chamber for cleansing it and the valves I and H. The operating mechanism for valve H being attached to section A', and the latter being screwed to the floor, the section A² may be removed without disarranging any of the other parts of the closet.

The ball I may be of rubber, glass, metal, or other suitable material; or it may consist of a rubber ball having an inclosed metal, glass, or other ball or load.

While I have shown the trap for the water-closet formed integrally therewith, I do not wish to be understood as confining my invention to such construction, as the trap may be formed separate therefrom, or be applied to any of the well-known styles of closets.

I am aware that pivoted or hinged valves have been located within the trap-chamber of water-closets, and I therefore do not wish to be understood as claiming water-closets provided with a trap having a valve permanently attached thereto; but

What I claim is—

1. A water-closet having a hopper, a receiver, and a trap sealed with a loose or disconnected ball or valve, substantially as shown and described.

2. A water-closet having a valve for the hopper, a receiver, and a trap sealed with a loose or disconnected ball or valve, substantially as shown and described.

3. The combination, with a water-closet, of a trap having its induction-opening sealed by a ball or valve and its eduction-pipe provided with an elongated mouth or outlet, substantially as shown and described.

4. A water-closet composed of two sections, one of which comprises a hopper and trap with supporting feet or base, and the other acts as a receiver for the hopper, substantially as shown and described.

5. The combination, with sections A' A², having flanges a' a² and interposed packing-ring b, of a frame, B, provided with set-screws b³, substantially as shown and described.

6. The combination, with section A', comprising hopper C and trap or chamber D, of the section A² and frame B, substantially as and for the purpose set forth.

7. The combination, with section A', comprising hopper C and chamber D, with ball or valve I, of removable section A², substantially as shown and described.

8. The combination, with section A', comprising hopper C, having overflow c', and valve H, with operating mechanism, and chamber D, having ball I, of a removable section, A², substantially as shown and described.

9. The combination, with sections A' A², the former consisting of two chambers, of gaskets E E, and valves I and H, with operating mechanism for the latter, substantially as shown and described.

10. A water-closet trap having a gasket or valve-seat provided with an annular groove, substantially as and for the purpose set forth.

11. The combination, with a water-closet, of a trap composed of a chamber having induction and eduction openings, the induction-opening having a gasket provided with an annular groove, to form a seat for a loose ball or valve, and the eduction-opening an elongated or enlarged mouth, substantially as shown and described.

12. The combination, with a water-closet, of a trap composed of a chamber, a ball or valve for the induction-opening, and an eduction-opening with elongated or enlarged mouth, substantially as shown and described.

13. The combination, with a water-closet, of a trap having an induction and an eduction opening and a grooved gasket, F, and loose ball or valve I, substantially as shown and described.

14. The flexible or elastic gasket F, having groove f and sides or lips $f^2$ $f^2$, substantially as shown and described.

15. The combination of section A', provided with chamber D, having valve I, with the section A², having plate E, provided with opening e and gasket F, substantially as shown and described.

16. In a water-closet, the chamber D, having an induction-opening sealed with a loose ball or valve, and an eduction-opening having an elongated or enlarged mouth, substantially as shown and described.

17. A water-closet comprising a hopper and chamber D, with induction-opening d, loose ball or valve I, ways or guides i i, and eduction-pipe d', substantially as shown and described.

In testimony whereof I affix my signature in presence of two witnesses.

JOSEPH BENNOR.

Witnesses:
S. J. VAN STAVOREN,
CHAS. F. VAN HORN.